United States Patent Office 2,737,523
Patented Mar. 6, 1956

2,737,523

N-(3-HALO-2-HYDROXYPROPYL)-p-AMINO-BENZOATE COMPOUNDS

David I. Weisblat, Galesburg, and Barney J. Magerlein, Donald R. Myers, and Arthur R. Hanze, Kalamazoo, Mich., and Stanley T. Rolfson, Martinsville, Va., assignors to The Upjohn Company, Kalamazoo, Mich., a corporation of Michigan No Drawing. Application October 30, 1952, Serial No. 317,813

8 Claims. (Cl. 260—470)

This invention relates to certain new halohydroxypropyl compounds and to a method for their preparation. This application is a continuation-in-part of application Serial No. 41,884, filed July 31, 1948, now United States Patent No. 2,629,733.

The compounds of the invention, herein defined as the "N-(3-halo-2-hydroxypropyl)-p-aminobenzoate compounds" have the generic formula

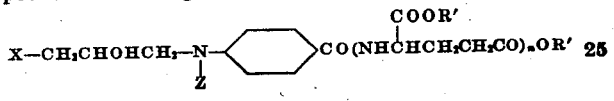

III
N-(3-halo-2-hydroxypropyl)-p-aminobenzoate compound wherein R' is a member of the group consisting of hydrogen and the alkyl radicals, n is a member of the group consisting of zero and the positive integers 1 to 7, inclusive, Z is a member of the group consisting of hydrogen and the arylsulfonyl radicals and X is a member of the group consisting of chlorine, bromine and iodine.

Many of the compounds of the invention are well defined crystalline substances soluble in alcohol and ether and in many other common organic liquids. When isolated in somewhat impure form certain of them are obtained as oily viscous liquids. The amino acids and esters form addition salts with acids which are soluble in water while the arylsulfonyl acids and esters are only sparingly soluble in water.

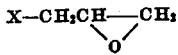

I
Epihalohydrin
+

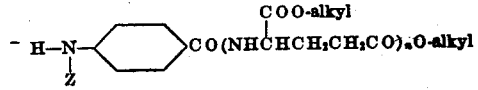

II
p-Aminobenzoate compound

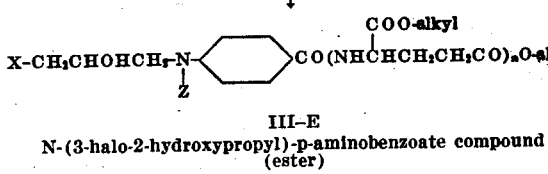

III-E
N-(3-halo-2-hydroxypropyl)-p-aminobenzoate compound (ester)

Alkali, then
acidification

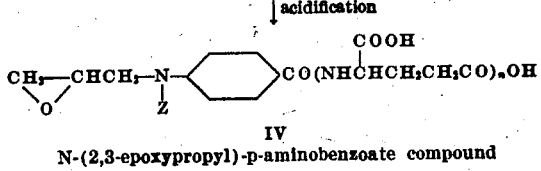

IV
N-(2,3-epoxypropyl)-p-aminobenzoate compound

HX

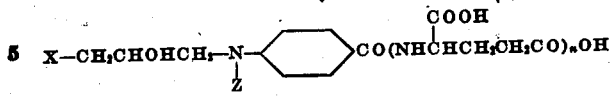

III-A
N-(3-halo-2-hydroxypropyl)-p-aminobenzoate compound (acid)

The N-(3-halo-2-hydroxypropyl)-p-aminobenzoate compounds of the invention which are esters (III-E) can be prepared readily, as indicated in the accompanying chart wherein X, n and Z have the values given previously, by reacting an epihalohydrin having the Formula I, i. e. epichlorohydrin, epibromohydrin or epiiodohydrin, with a p-aminobenzoate compound (II). The N-(3-halo-2-hydroxypropyl)-p-aminobenzoate compounds of the invention which are acids (III-A) can be prepared from the esters (III-E) by first reacting them with an alkali to convert the 3-halo-2-hydroxypropyl radical to the 2,3-epoxypropyl radical and hydrolyze the ester radicals, either simultaneously or sequentially, to form a salt of an N-(2,3-epoxypropyl)-p-aminobenzoate compound (IV). The free acid can be liberated by acidification and, upon reaction with a hydrogen halide, i. e. with hydrogen chloride, hydrogen bromide or hydrogen iodide, is converted to the acid N-(3-halo-2-hydroxypropyl)-p-aminobenzoate compounds (III-A).

In the naming of compounds of the invention and of other compounds mentioned herein when both a glutamic acid residue and a p-aminobenzoic acid residue are included in the molecule, the nitrogen atom of the glutamic acid residue is, for convenience, herein referred to by the symbol "N'" and the nitrogen atom of the p-aminobenzoic acid nucleus is referred to by the symbol "N." In the structural formulae given herein, aromatic nuclei are represented by one or more simple hexagons.

The N-(3-halo-2-hydroxypropyl)-p-aminobenzoate compounds (III) are valuable as intermediates in the preparation of other compounds which, in turn, are useful in the preparation of certain compounds referred to broadly in the art as "folic acids." Thus, as described and claimed in concurrently filed co-pending application Serial No. 317,812, now U. S. Patent 2,673,861, which is a continuation-in-part of the parent application, they can be converted readily to N-(2,3-epoxypropyl)-p-aminobenzoate compounds having the Formula IV given previously herein which, as described and claimed in the parent application Serial No. 41,884, now U. S. Patent 2,629,733, are converted readily to N-(3-oxy-2-hydroxypropyl)-p-aminobenzoate compounds. As described in co-pending application Serial No. 41,889, now U. S. Patent 2,625,562, and as claimed in concurrently filed co-pending application Serial No. 317,814, now U. S. Patent 2,674,617, which is a continuation-in-part thereof, diethyl N'-(N-(3-methoxy-2-hydroxypropyl)-N-(p-toluenesulfonyl)-p-aminobenzoyl)-glutamate can be oxidized, e. g. with chromic acid, to form diethyl N'-(N-(3-methoxy-2-ketopropyl)-N-(p - toluenesulfonyl)- p - aminobenzoyl)-glutamate which can then be condensed with 2,4,5-triamino-6-hydroxypyrimidine, as described and claimed in U. S. Patent 2,558,711, to form diethyl N'-(N((2-amino-4-hydroxy-6-pteridyl)- methyl)- N -(p - toluenesulfonyl)-p-aminobenzoyl)-glutamate. Upon treatment of the latter compound with hydrogen bromide in an aliphatic acid medium to split the p-toluenesulfonyl radical from the molecule, and in the presence of a bromine acceptor to prevent bromination in the benzene nucleus of the aminobenzoic acid residue according to the method described and claimed in U. S. Patent 2,562,222, and after subsequent hydrolysis of the ester groups, there is formed N'-(N-((2-amino-4-hydroxy-6-pteridyl)methyl)-p-aminobenzoyl)-glutamic acid (pteroylglutamic acid) generally recognized, when the glutamic acid residue has the same configuration as l(+)-glutamic acid, as being identical with the "L. casei factor" or vitamin Bc from liver.

In similar fashion, other N-(3-oxy-2-hydroxypropyl)-p-aminobenzoate compounds can be prepared from the compounds of the invention and oxidized to the 2-ketopropyl compounds and the latter then condensed with 2,4,5-triamino-6-hydroxypyrimidine to form the corresponding 2-amino-4-hydroxy-6-pteridyl compounds and the latter then converted to compounds of the folic acid type in the manner just described.

As indicated by the formula given, compounds containing more than one glutamic acid or ester residue contemplated by the invention are those wherein only the gamma-carboxyl groups are involved in the peptide linkages, such as the residues derived from N'-(p-aminobenzoyl)-gamma - glutamylglutamic acid, N'-(p - aminobenzoyl)-gamma-glutamyl-gamma-glutamylglutamic acid, and the like. Preferred compounds of the invention are those wherein n represents the integer 1, i. e. those containing one glutamic acid or ester residue, and the invention will be described with particular reference thereto.

Compounds similar to, or identical with, those of the folic acid group made by using compounds of the invention as intermediates, such as pteroylglutamic acid, which are of greatest value as measured by their biological activity against *Lactobacillus casei* or *Streptococcus fecalis* R., are those wherein the glutamic acid residues possess the same configuration as l(+)-glutamic acid. However, the invention also contemplates compounds having the dextro configuration as well as racemic mixtures.

Compounds wherein Z of the generic formula given represents an arylsulfonyl radical are of particular value because of the protection afforded the aromatic amino group by the arylsulfonyl group. Compounds having the amino group thus protected are often not subject to decomposition and the formation of by-products when employed as a reactant, e. g. when converted to the 3-oxy-2-hydroxypropyl compound mentioned and oxidized with chromic acid, to nearly the same extent as are compounds in which the aromatic amino group is unprotected. Following the carrying out of a reaction using a compound containing such an arylsulfonylamino group, the arylsulfonyl radical can be split readily from the molecule formed, as mentioned previously, by treating the compound with hydrogen bromide in an aliphatic acid medium and in the presence of a bromine acceptor. By such treatment, the arylsulfonyl radical is split from the molecule to give a high yield of the amine and bromination in the benzene nucleus is effectively prevented.

Although the invention will be described in the case of arylsulfonyl compounds with particular reference to p-toluenesulfonyl compounds, it is understood that the invention contemplates compounds containing other arylsulfonyl radicals, such as the o-toluenesulfonyl, benzenesulfonyl, and naphthalenesulfonyl radicals as well as many others. Arylsulfonyl radicals having substituents, such as chlorine, bromine or a nitro group, on the aromatic nucleus can also be used provided only that the substituent is non-reactive under the reaction conditions. The preferred arylsulfonyl radical is the p-toluenesulfonyl radical because the compounds formed are generally well defined crystalline solids and because it has been found that higher yields of amines are often formed when splitting a p-toluenesulfonylamino compound using hydrogen bromide than when splitting certain other arylsulfonyl derivatives of the same amino compound. It should be mentioned, furthermore, that the method involved in the present invention can be carried out and the corresponding intermediate and final compounds prepared using starting compounds wherein the arylsulfonyl group is replaced by an alkylsulfonyl, aralkylsulfonyl or cycloalkylsulfonyl group, such as the methanesulfonyl, alpha-toluenesulfonyl or cyclohexylsulfonyl radicals, respectively.

Although the benzoic acid ester or glutamic acid ester residues present in the compounds of the invention can comprise any alkyl ester, such as the methyl, ethyl, n-propyl, iso-propyl, n-butyl, amyl, lauryl, dodecyl and many other esters, the preferred ester is the ethyl ester due to matters of convenience and economy.

Although the invention is directed, particularly in case of esters of the glutamic acid residues, to alkyl esters, the process of the invention can also be carried out and corresponding compounds prepared using other esters, such as the phenyl, tolyl, xylyl, cyclohexyl, benzyl and many other aryl, aralkyl or cycloalkyl esters.

The p-aminobenzoate compounds (II) used as starting materials can be obtained by the method described and claimed in part in co-pending application Serial No. 41,888. According to the method of the co-pending application, a p-aminobenzoate compound having one glutamic acid residue in the molecule is prepared by reacting an alkyl ester of glutamic acid with an N-(arylsulfonyl)-p-aminobenzoyl halide or with a p-nitrobenzoyl halide. The halides referred to in this connection are the chlorides and the bromides. When a p-nitrobenzoyl halide is used, an ester of N'-(p-nitrobenzoyl)-glutamic acid is first obtained which, upon reduction, e. g. with hydrogen using platinum oxide as a catalyst, yields an ester of N'-(p-aminobenzoyl)-glutamic acid. The latter compound can be converted readily by means of an arylsulfonyl halide to an ester of N'-(N-(arylsulfonyl)-p-aminobenzoyl)-glutamic acid. When an N-(arylsulfonyl)-p-aminobenzoyl halide is reacted with an ester of glutamic acid, an ester of N'-(N-(arylsulfonyl)-p-aminobenzoyl)-glutamic acid is formed directly. The latter compound can, if desired, be treated with hydrogen bromide and a bromine acceptor, such as phenol, or catechol, in an aliphatic acid medium to split the arylsulfonyl radical from the molecule and form an N'-(p-aminobenzoyl)-glutamic acid or its ester according to the method described and claimed in U. S. Patent 2,562,222, mentioned previously. Furthermore, the esters can be hydrolyzed to the N'-(p-aminobenzoyl)-glutamic and the N'-(N-(arylsulfonyl)-p-aminobenzoyl)-glutamic acids and these acids can, if desired, be reconverted to the corresponding alkyl esters, e. g. by treatment with an alkanol and an esterification catalyst in known manner. In similar manner, other p-aminobenzoate compounds can be prepared having up to seven glutamic acid residues in the molecule by starting with the corresponding gamma-glutamylglutamic acids or esters containing the requisite number of peptide linkages.

The reaction of an epihalohydrin with a p-aminobenzoate compound can be carried out conveniently by heating a mixture of the substances, preferably with agitation and with the addition of a catalytic proportion of pyridine, quinoline, triethyl amine, tributyl amine or other tertiary amine to the mixture. A vigorous reaction generally takes place upon the addition of the amine and after a short time the mixture can be cooled and the excess of the epihalohydrin volatilized under reduced pressure. The residue consisting of an N-(3-halo-2-hydroxypropyl)-p-aminobenzoate compound is usually obtained sufficiently pure for use without additional purification. Certain of the compounds thus obtained are solids which can be purified by recrystallization, e. g. from dilute alcohol or benzene, and which are only very slightly soluble in water.

The reaction of an N-(3-halo-2-hydroxypropyl)-p-aminobenzoate compound with an alkali to form an N-(2,3-epoxypropyl)-p-aminobenzoate compound which is an ester can be carried out by refluxing a mixture of water and the halogen compound and adding one chemically equivalent proportion of alkali slowly to the mixture so as to avoid an excessive degree of alkalinity. Organic solvents, such as alcohol or methyl ethyl ketone, can be included in the mixture to increase the solubility of the reactants, if desired. The use of more than about one chemically equivalent proportion of alkali is generally avoided except where concurrent hydrolysis of ester groups is desired. In the latter instance, about one chemically equivalent proportion of alkali is also added for each ester group present in the halogen compound. If desired, the epoxy esters can be recovered from the reaction mixture and subsequently hydrolyzed with alkali to form the epoxy acids.

The formation of the epoxy compound is usually substantially complete after for from about one-half to about one hour of refluxing, depending upon the particular alkali used and the rate of addition thereof, and the mixture can then be worked up in any appropriate manner to recover the epoxy compound. In the case of epoxy compounds which are acids, the mixture can be poured into water and the epoxy acids, which are usually well defined crystalline solids, can be recovered by filtering and, if desired, purified by crystallizing from dilute ethanol or the like. In the case of epoxy esters, which frequently are obtained as oily products, the epoxy compounds can be recovered by evaporating the mixture to dryness in vacuo, dissolving the residue in ether and, after washing the ethereal solution with water or aqueous sodium bicarbonate to remove inorganic salts and acids, volatilizing the ether.

The conversion of an N-(2,3-epoxypropyl)-p-aminobenzoate compound (IV) to an acid N-(3-halo-2-hydroxypropyl)-p-aminobenzoate compound (III-A) is effected, as mentioned previously, by treating the compound with a hydrogen halide, preferably in an anhydrous medium such as ether. The reaction mixture is generally stirred at ordinary or slightly elevated temperatures for one or two hours during which time some of the product generally crystallizes unless a large excess of solvent is used. Most of the solvent can then be volatilized in vacuo and the crystals recovered by filtering and drying. The acids are thus generally obtained as crystalline solids having sharp melting points.

Certain advantages of the invention are apparent from the following examples which are given by way of illustration only and are not to be construed as limiting.

*Example 1.—Ethyl N-(beta-naphthalenesulfonyl)-p-aminobenzoate*

Three hundred milliliters of pyridine was mixed with 165.2 grams of ethyl p-aminobenzoate. The ester dissolved with the evolution of heat. Two hundred forty-eight grams of beta-naphthalenesulfonyl chloride was stirred slowly into the mixture and stirring was continued for an additional thirty-five minutes. The mixture was then cooled, stirred with two liters of water and filtered. A small sample of the solid ethyl N-(beta-naphthalenesulfonyl)-p-aminobenzoate which was retained on the filter was crystallized from ethyl Cellosolve. The crystallized product melted at 188 degrees to 191 degrees C.

*Example 2.—N-(beta-naphthalenesulfonyl)-p-aminobenzoic acid*

The ethyl N-(beta-naphthalenesulfonyl)-p-aminobenzoate, prepared from 165.2 grams of ethyl p-aminobenzoate and 248 grams of beta-naphthalenesulfonyl chloride was mixed with 200 grams of sodium hydroxide and about six liters of water. The mixture was refluxed for about one hour and then cooled and acidified with concentrated hydrochloric acid. The white solid which separated was recovered by filtering. It was stirred with two liters of cold water and the mixture again filtered. The filter cake was dried in vacuo and there was thus obtained 300.4 grams of N-(beta-naphthalenesulfonyl)-p-aminobenzoic acid melting without further purification at 230 degrees to 240 degrees C.

*Example 3.—N-(beta-naphthalenesulfonyl)-p-aminobenzoyl chloride*

One hundred nine grams of N-(beta-naphthalenesulfonyl)-p-aminobenzoic acid was stirred with three liters of toluene. One hundred ninety-six grams of thionyl chloride was added over a 30 minute period and the mixture then refluxed for two hours. The hot solution was filtered and cooled and the crystals which separated were recovered by filtering. There were thus obtained 101 grams of N-(beta-naphthalenesulfonyl)-p-aminobenzoyl chloride melting at 128 degrees to 133 degrees C. Refrigeration and filtration of the mother liquor gave an additional 19.8 grams of crystals melting at 130 degrees to 140 degrees C.

*Example 4.—Diamyl N'-(N-(beta-naphthalenesulfonyl)-p-aminobenzoyl)-glutamate*

A mixture was prepared consisting of 50 grams of N-(beta-naphthalenesulfonyl)-p-aminobenzoyl chloride, 360 milliliters of ethylene dichloride and 55.7 grams of diamyl glutamate hydrogen sulfate. The mixture was cooled to about 15 degrees C. and a solution of 29.5 grams of triethylamine in 90 milliliters of ethylene dichloride was added over a 20 minute period while maintaining the temperature of the mixture below about 20 degrees C. The mixture was stirred for about 1.5 hours and then washed twice with 60 milliliter portions of water, once with 60 milliliters of 2 N hydrochloric acid, twice with 30 milliliter portions of saturated sodium bicarbonate solution, twice with 50 milliliter portions of water and, finally, with 100 milliliters of saturated sodium chloride solution. The resulting product was dried with anhydrous sodium sulfate, filtered and the filtrate refrigerated over night. The refrigerated solution was filtered and the small amount of solid material which had separated was discarded. The ethylene dichloride was volatilized in vacuo from the filtrate. One fourth of the residue was set aside and the remainder was crystallized twice from 100 milliliter portions of alcohol. There was thus obtained 22.5 grams of diamyl N'-(N-(beta-naphthalenesulfonyl)-p-aminobenzoyl)-glutamate. Repeated crystallization of the product from alcohol raised the melting point to 123–124.5 degrees C.

*Example 5.—Diethyl N'-(N-(p-toluenesulfonyl)-p-aminobenzoyl)-glutamate*

A mixture of 407 grams of N-(p-toluenesulfonyl)-p-aminobenzoic acid and 3,450 milliliters of toluene was dried by distilling the mixture until 350 milliliters of distillate had been collected. A few drops of pyridine and 50 milliliters of thionyl chloride was then added to the dry toluene solution and the mixture stirred and refluxed for one-half hour. The solution was then cooled with agitation for 2 hours and the solid which precipitated was recovered by filtering and washing with toluene and then with mixed hexanes and drying. There was thus obtained 387 grams of N-(p-toluenesulfonyl)-p-aminobenzoyl chloride melting at 141 degrees to 142 degrees C.

A mixture of 48 grams of diethyl l(+)-glutamate hydrochloride, 68 grams of N-(p-toluenesulfonyl)-p-aminobenzoyl chloride, 19 grams of magnesium oxide, 250 milliliters of ethylene dichloride and 100 milliliters of water was stirred with cooling for about 4 hours. The mixture was filtered and the organic layer was separated from the filtrate and washed successively with water, ice cold dilute hydrochloric acid, water and dilute aqueous sodium bicarbonate. The washed organic layer was then dried and diluted with mixed hexanes until slightly turbid and allowed to crystallize. Upon filtering the mixture, there was obtained 78 grams of diethyl N'-(N-(p-toluenesulfonyl)-p-aminobenzoyl)-l-glutamate melting at 125 degrees to 126 degrees C. and having a specific rotation $(\alpha)_D^{25} = -13.2$ degrees in a mixture of 5 per cent methanol and 95 per cent of 95 per cent ethanol. The diester is hydrolyzed readily with dilute sodium hydroxide to form N' - (N-(p-toluenesulfonyl)-p-aminobenzoyl)-l-glutamic acid.

In similar manner there is obtained dibutyl N'-(N-(benzenesulfonyl)-p-aminobenzoyl)-glutamate when the N-(p-toluenesulfonyl)-p-aminobenzoic acid is replaced with a substantially equi-molar proportion of N-(benzenesulfonyl)-p-aminobenzoic acid and the diethyl l(+)-glutamate hydrochloride is replaced with a substantially equi-molar proportion of dibutyl glutamate hydrochloride. The employment of N-(p-chlorobenzenesulfonyl)-p-aminobenzoic acid and dimethyl glutamate hydrochloride under similar circumstances leads to the formation of dimethyl N'-(N-(p-chlorobenzenesulfonyl)-p-aminobenzoyl)-glutamate. Hydrolysis of these esters with dilute sodium hydroxide gives N'-(N-(benzenesulfonyl)-p-aminobenzoyl)-glutamic acid, and N'-(N-(p-chlorobenzenesulfonyl) - p - aminobenzoyl)-glutamic acid, respectively.

*Example 6.—Ethyl N-(3-chloro-2-hydroxypropyl)-N-(p-toluenesulfonyl)-p-aminobenzoate*

A mixture of five grams of ethyl N-(p-toluenesulfonyl)-p-aminobenzoate and 3.4 milliliters of epichlorohydrin was heated at 135 degrees C. and two drops of pyridine added. A vigorous action ensued and after five minutes the mixture was cooled, dissolved in 50 milliliters of ethanol and treated three times with decolorizing carbon. The ethyl N-(3-chloro-2-hydroxypropyl)-N-(p-toluenesulfonyl)-p-aminobenzoate, which remained upon volatilization of the ethanol and excess epichlorohydrin in vacuo, was used in subsequent reactions without further purification.

The employment of a substantially equi-molar proportion of ethyl N-(benzenesulfonyl)-p-aminobenzoate, ethyl N - (naphthalenesulfonyl) - p - aminobenzoate or of amyl N-(p-chlorobenzenesulfonyl)-p-aminobenzoate in place of ethyl N-(p-toluenesulfonyl)-p-aminobenzoate in the foregoing procedure leads to the formation of ethyl N - (3 - chloro - 2 - hydroxypropyl) - N - (benzenesulfonyl) - p - aminobenzoate, ethyl N - (3 - chloro - 2 - hydroxypropyl) - N - (naphthalenesulfonyl) - p - aminobenzoate and amyl N-(3-chloro-2-hydroxypropyl)-N-(p-chlorobenzenesulfonyl) - p - aminobenzoate, respectively. The employment of a substantially equi-molar proportion of epibromohydrin or of epiiodohydrin in place of the epichlorohydrin yields ethyl N-(3-bromo-2-hydroxypropyl) - N - (p - toluenesulfonyl) - p - aminobenzoate and ethyl N - (3 - iodo - 2 - hydroxypropyl) - N - (p - toluenesulfonyl)-p-aminobenzoate, respectively.

*Example 7.—Diethyl N'-(N-(3-chloro-2-hydroxypropyl)-N-(p-toluenesulfonyl)-p-aminobenzoyl)-glutamate*

A mixture of 2.85 grams of diethyl N'-(N-(p-toluenesulfonyl) - p - aminobenzoyl) glutamate and 1.1 grams of epichlorohydrin was agitated at 135 degrees C. Two drops of pyridine were added and agitation at 135 degrees C. was continued for 5 minutes. The excess epichlorohydrin was volatilized under reduced pressure. The residue which consisted of diethyl N'-(N-(3-chloro-2-hydroxypropyl) - N - (p - toluenesulfonyl) - p - aminobenzoyl)-glutamate was used in subsequent experiments without further purification.

When epibromohydrin or epiiodohydrin is substituted in approximately equi-molar proportions for epichlorohydrin in the above procedure there is produced diethyl N' - (N - (3 - bromo - 2 - hydroxypropyl) - N - (p - toluenesulfonyl) - p - aminobenzoyl) - glutamate or diethyl N' - (N - (3 - iodo - 2 - hydroxypropyl) - N - (p - toluenesulfonyl) - p - aminobenzoyl) - glutamate, respectively. Also, by replacing the diethyl N'-(N-(p-toluenesulfonyl)-p-aminobenzoyl)-glutamate with an approximately equi-molar proportion of dibutyl N'-(N-(benzenesulfonyl) - p - aminobenzoyl) - glutamate, diamyl N' - )N-(naphthalenesulfonyl) - p - aminobenzoyl) - glutamate or dimethyl N' - (N - (p - chlorobenzenesulfonyl) - p - aminobenzoyl) - glutamate there is obtained dibutyl N' - (N - (3 - chloro - 2 - hydroxypropyl) - N - (benzenesulfonyl) - p - aminobenzoyl) - glutamate, diamyl N' - (N - (3 - chloro - 2 - hydroxypropyl) - N - (naphthalenesulfonyl) - p - aminobenzoyl) - glutamate or dimethyl N' - (N - (3 - chloro - 2 - hydroxypropyl) - N - (p - chlorobenzenesulfonyl)-p-aminobenzoyl)-glutamate, respectively.

*Example 8.—Ethyl N-(2,3-epoxypropyl)-N-(p-toluenesulfonyl)-p-aminobenzoate*

Sufficient 10 per cent aqueous sodium hydroxide was added drop-wise to a boiling alcoholic solution of ethyl N - (3 - chloro - 2 - hydroxypropyl) - N - (p - toluenesulfonyl)-p-aminobenzoate containing three drops of phenolphthalein indicator solution to just maintain a permanent pink color. When no more alkali was required, the solution was diluted with water and filtered. There was thus obtained 4.1 grams of ethyl N-(2,3-epoxypropyl) - N - (p - toluenesulfonyl) - p - aminobenzoate as a residue melting at 69 degrees to 71 degrees C. Upon recrystallization from dilute ethanol, the compound melted at 71 degrees to 72 degrees C.

*Analysis.*—Calcd. for $C_{19}H_{21}O_5NS$: C, 60.8; H, 5.6; N, 3.7. Found: C, 59.9; H, 5.8; N, 3.7.

In a similar manner the substitution of equi-molar proportions of ethyl N-(3-chloro-2-hydroxypropyl)-N-(benzenesulfonyl) - p - aminobenzoate, ethyl N - (3 - chloro-2 - hydroxypropyl) - N - (naphthalenesulfonyl) - p -aminobenzoate, amyl N - (3 - chloro - 2 - hydroxypropyl) - N - (p - chlorobenzenesulfonyl) - p - aminobenzoate, or ethyl N - (3 - bromo - 2 - hydroxypropyl) - N - (p - toluenesulfonyl) - p - aminobenzoate for the ethyl N-(3 - chloro - 2 - hydroxypropyl) - N - (p - toluenesulfonyl) - p - aminobenzoate in the foregoing procedure leads to the formation of ethyl N-(2,3-epoxypropyl)-N-(benzenesulfonyl) - p - aminobenzoate, ethyl N - (2,3 -epoxypropyl) - N - (naphthalenesulfonyl) - p - aminobenzoate, amyl N - (2,3 - epoxypropyl) - N - (p - chlorobenzenesulfonyl) - p - aminobenzoate, or ethyl N - (2,3 - epoxypropyl) - N - (p - toluenesulfonyl) - p -aminobenzoate, respectively.

*Example 9.—N-(2,3-epoxypropyl)-N-(p-toluenesulfonyl)-p-aminobenzoic acid*

A solution of 5 grams of the ethyl N-(2,3-epoxypropyl)-N-(p-toluenesulfonyl)-p-aminobenzoate and 0.56 gram of potassium hydroxide in a mixture of 16 milliliters of water and 40 milliliters of dioxane was warmed at 60 degrees C. for 1 hour. The solution was then cooled, diluted with water and extracted with ether to remove any unreacted ester. The extracted solution was then acidified carefully with dilute sulfuric acid and the mixture filtered. There was thus obtained 3.69 grams of N-(2,3-epoxypropyl)-N-(p-toluenesulfonyl)-p-aminobenzoic acid in the form of white crystals melting at 110 degrees to 119 degrees C. After one recrystallization from dilute ethanol, the compound melted at 124 degrees to 127 degrees C.

When the hydrolysis just described is carried out using approximately equi-molar proportions of ethyl N-(2,3-epoxypropyl) - N - (benzenesulfonyl) - p - aminobenzoate, ethyl N-(2,3-epoxypropyl)-N-(naphthalenesulfonyl)-p-aminobenzoate or amyl N-(2,3-epoxypropyl)-N-(p-chlorobenzenesulfonyl)-p-aminobenzoate in place of the ethyl N - (2,3 - epoxypropyl) - N - (p - toluenesulfonyl) - p -aminobenzoate, there is obtained N-(2,3-epoxypropyl)-N-(benzenesulfonyl)-p-aminobenzoic acid, N-(2,3-epoxypropyl)-N-(naphthalenesulfonyl)-p-aminobenzoic acid or N - (2,3-epoxypropyl) - N - (p - chlorobenzenesulfonyl) -p-aminobenzoic acid, respectively.

*Example 10.—Diethyl N'-(N-(2,3-epoxypropyl)-N-(p-toluenesulfonyl)-p-aminobenzoyl)-glutamate*

A mixture consisting of about 1.3 grams of diethyl N' - (N - (3 - chloro - 2 - hydroxypropyl) - N - (p - toluenesulfonyl)-p-aminobenzoyl)-glutamate, 20 milliliters of methyl ethyl ketone, 0.17 gram of sodium bicarbonate and 3 milliliters of water was refluxed for 40 minutes. The methyl ethyl ketone and water were then distilled in vacuo and the residue taken up in a mixture of ether and water containing a small proportion of alcohol. The ether layer was separated, washed with cold dilute sulphuric acid, then with water and saturated sodium bicarbonate solution and, finally, twice with water and once with saturated sodium chloride solution. The washed solution was filtered through anhydrous sodium sulfate and the ether distilled in vacuo. The residue consisted of 0.98 gram of diethyl N'-(N-(2,3-epoxypropyl)-N - (p - toluenesulfonyl) - p - aminobenzoyl) - glutamate in the form of a light brown oil. This is a yield of 87.5 per cent of the theoretical amount.

When the above procedure was carried out using dilute ethanol instead of methyl ethyl ketone, there was obtained a 75 per cent yield of product which upon assay for epoxy content proved to be 80 per cent pure diethyl N' - (N - (2,3 - epoxypropyl) - N - (p - toluenesulfonyl) - p-aminobenzoyl)-glutamate.

When the procedure was carried out using anhydrous potassium carbonate and anhydrous methyl ethyl ketone there was obtained a 72 per cent yield of product which upon assay was found to contain 42.8 per cent of diethyl N' - (N - (2,3 - epoxypropyl) - N - (p - toluenesulfonyl) - p-aminobenzoyl)-glutamate.

Using the procedure of the first paragraph and substituting approximately equi-molar quantities of dibutyl N' - (N - (3 - chloro - 2 - hydroxypropyl) - N - (benzenesulfonyl)-p-aminobenzoyl)-glutamate, diamyl N'-(N-(3-chloro - 2 - hydroxypropyl) - N - (naphthalenesulfonyl) - p-aminobenzoyl)-glutamate, dimethyl N'-(N-(3-chloro-2-hydroxypropyl) - N - (p - chlorobenzenesulfonyl) - p - aminobenzoyl)-glutamate or diethyl N'-(N-(3-bromo-2-hydroxypropyl) - N - (p - toluenesulfonyl) - p - aminobenzoyl)-glutamate for the diethyl N'-(N-(3-chloro-2-hydroxypropyl) - N - (p - toluenesulfonyl) - p - aminobenzoyl)-glutamate there is obtained dibutyl N'-(N-(2,3-epoxypropyl) - N - (benzenesulfonyl) - p - aminobenzoyl) - glutamate, diamyl N'-(N-(2,3-epoxypropyl)-N-(naphthalenesulfonyl)-p-aminobenzoyl)-glutamate, dimethyl N'-(N - (2,3 - epoxypropyl) - N - (p - chlorobenzenesulfonyl)-p-aminobenzoyl)-glutamate or diethyl N'-(N-(2,3-epoxypropyl) - N - (p - toluenesulfonyl) - p - aminobenzoyl)-glutamate, respectively. Hydrolysis of these epoxy esters substantially as by the method of Example 9 yields N' - (N - (2,3 - epoxypropyl) - N - (benzenesulfonyl)-p-aminobenzoyl)-glutamic acid, N'-(N-(2,3-epoxypropyl) - N - (naphthalenesulfonyl) - p - aminobenzoyl)-glutamic acid, N'-(N-(2,3-epoxypropyl)-N-(p-chlorotoluenesulfonyl)-p-aminobenzoyl)-glutamic acid and N' - (N - (2,3 - epoxypropyl) - N - (p - toluenesulfonyl) - p-aminobenzoyl)-glutamic acid, respectively.

*Example 11.—N-(3-chloro-2-hydroxypropyl)-N-(p-toluenesulfonyl)-p-aminobenzoic acid*

A solution of 2.01 grams of recrystallized N-(2,3-epoxypropyl)-N-(p-toluenesulfonyl)-p-aminobenzoic acid in 30 milliliters of 0.57 normal hydrochloric acid in ether was stirred at room temperature for about two hours. Crystals separated from the mixture during the period of stirring. After removing most of the ether in vacuo, the crystals were recovered by filtering and drying. There was thus obtained 1.65 grams of N-(3-chloro-2-hydroxypropyl)-N-(p-toluenesulfonyl)-p-aminobenzoic acid in the form of crystals melting at 157 degrees to 161 degrees C.

Replacement of the N-(2,3-epoxypropyl)-N-(p-toluenesulfonyl)-p-aminobenzoic acid in the foregoing procedure with an approximately equi-molar quantity of N-(2,3-epoxypropyl)-N-(benzenesulfonyl)-p-aminobenzoic acid, N-(2,3-epoxypropyl)-N-(beta-naphthalenesulfonyl)-p-aminobenzoic acid, N-(2,3-epoxypropyl)-N-(p-chlorobenzenesulfonyl) - p - aminobenzoic acid, N' - (N - (2,3-epoxypropyl)-N-(p-toluenesulfonyl) - p - aminobenzoyl)-glutamic acid, N'-(N-(2,3-epoxypropyl)-N-(benzenesulfonyl)-p-aminobenzoyl)-glutamic acid, N'-(N-(2,3-epoxypropyl) - N - (beta - naphthalenesulfonyl) - p - aminobenzoyl)-glutamic acid or N'-(N-(2,3-epoxypropyl)-N-(p-chlorobenzenesulfonyl)-p-aminobenzoyl) - glutamic acid yields N-(3-chloro-2-hydroxypropyl)-N-(benzenesulfonyl)-p-aminobenzoic acid, N-(3-chloro-2-hydroxypropyl)-N-(beta-naphthalenesulfonyl)-p-aminobenzoic acid, N-(3-chloro - 2 - hydroxypropyl) - N - (p-chlorobenzenesulfonyl)-p-aminobenzoic acid, N'-(N-(3-chloro-2-hydroxypropyl)-N-(p-toluenesulfonyl)-p-aminobenzoyl)-glutamic acid, N'-(N-(3-chloro-2-hydroxypropyl)-N-(benzenesulfonyl)-p-aminobenzoyl)- glutamic acid, N'-(N-(3-chloro-2-hydroxypropyl)-N-(beta-naphthalenesulfonyl)-p-aminobenzoyl)-glutamic acid or N'-(N-(3-chloro-2-hydroxypropyl)-N-(p - chlorobenzenesulfonyl)-p-aminobenzoyl)-glutamic acid, respectively.

The corresponding 3-bromo-2-hydroxypropyl and 3-iodo-2-hydroxypropyl compounds are prepared in entirely analogous fashion using a chemically equivalent proportion of hydrobromic acid or of hydroiodic acid in place of hydrochloric acid.

It is to be understood that the invention is not to be limited to the exact details of operation or exact compounds shown and described, as obvious modifications and equivalents will be apparent to one skilled in the art, and the invention is, therefore, to be limited only by the scope of the appended claims.

We claim:

1. The method which includes: heating a mixture comprising an epihalohydrin selected from the group consisting of epichlorohydrins, epibromohydrins and epiiodohydrins and a compound having the formula

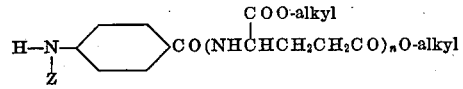

wherein Z is a member of the group consisting of hydrogen and the arylsulfonyl radicals and $n$ is a member of the group consisting of zero and the positive integer 1 to form a compound having the formula

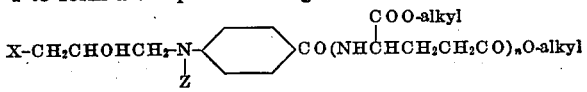

wherein X is the halogen of the epihalohydrin used.

2. The method of claim 1 wherein Z is an arylsulfonyl radical, $n$ is the integer 1 and X is chlorine.

3. The method which includes: heating a mixture comprising epichlorohydrin and ethyl N-(p-toluenesulfonyl)-p-aminobenzoate to form ethyl N-(3-chloro-2-hydroxypropyl)-N-(p-toluenesulfonyl)-p-aminobenzoate.

4. The method which includes: heating a mixture comprising epichlorohydrin and diethyl N'-(N-(p-toluenesulfonyl)-p-aminobenzoyl)-glutamate to form diethyl N'-(N-(3-chloro-2-hydroxypropyl)-N-(p - toluenesulfonyl)-p-aminobenzoyl)-glutamate.

5. A compound having the formula

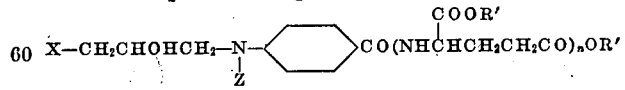

wherein X is a halogen selected from the group consisting of chlorine, bromine and iodine, Z is a member of the group consisting of hydrogen and the arylsulfonyl radicals, $n$ is a member of the group consisting of zero and the positive integer 1 and R' is a member of the group consisting of hydrogen and the alkyl radicals.

6. A compound as claimed in claim 5 wherein X is chlorine, Z is an arylsulfonyl radical, $n$ is the integer 1 and R' is an alkyl radical.

7. Ethyl N-(3-chloro-2-hydroxypropyl)-N-(p-toluenesulfonyl)-p-aminobenzoate.

8. Diethyl N'-(N-(3-chloro-2-hydroxypropyl) - N - (p-toluenesulfonyl)-p-aminobenzoyl) glutamate.

No references cited.